Jan. 26, 1971  S. D. WANLASS  3,559,032
VOLTAGE REGULATING AND PHASE SHIFTING CIRCUITS
EMPLOYING BOTH A PARAMETRIC CIRCUIT AND
A TRANSFORMER TO TRANSFER ENERGY
Filed April 2, 1968
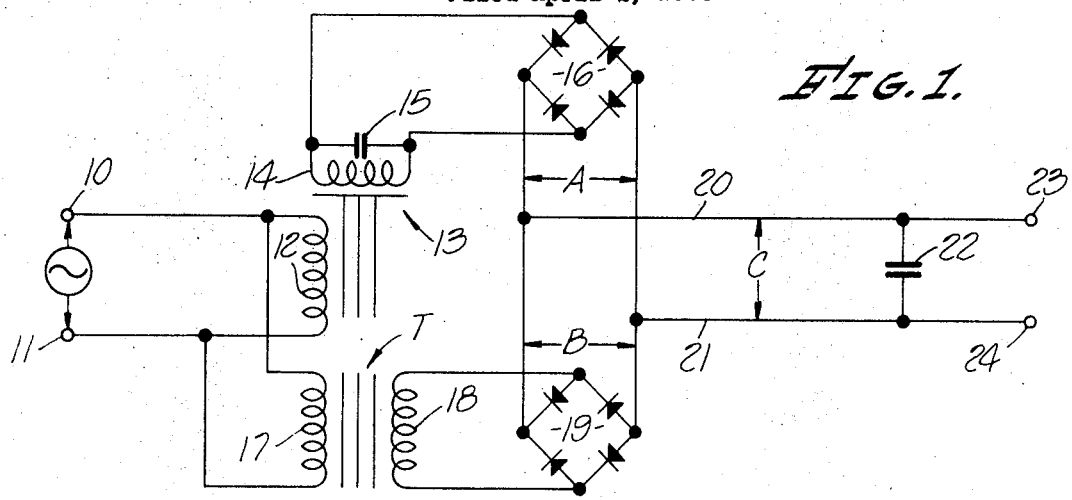
FIG. 1.
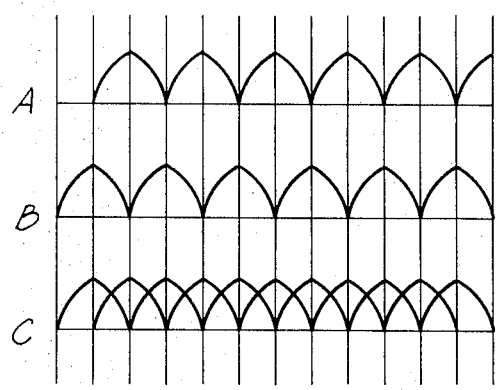
FIG. 2.
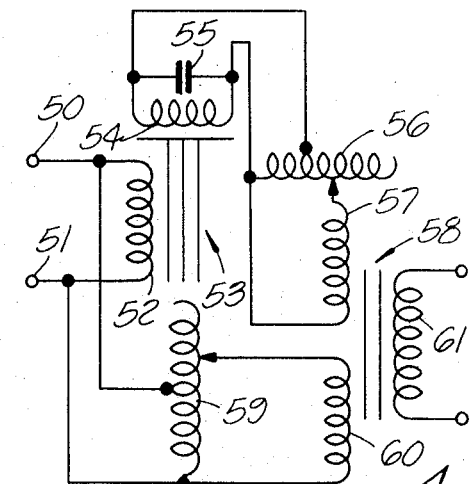
FIG. 4.
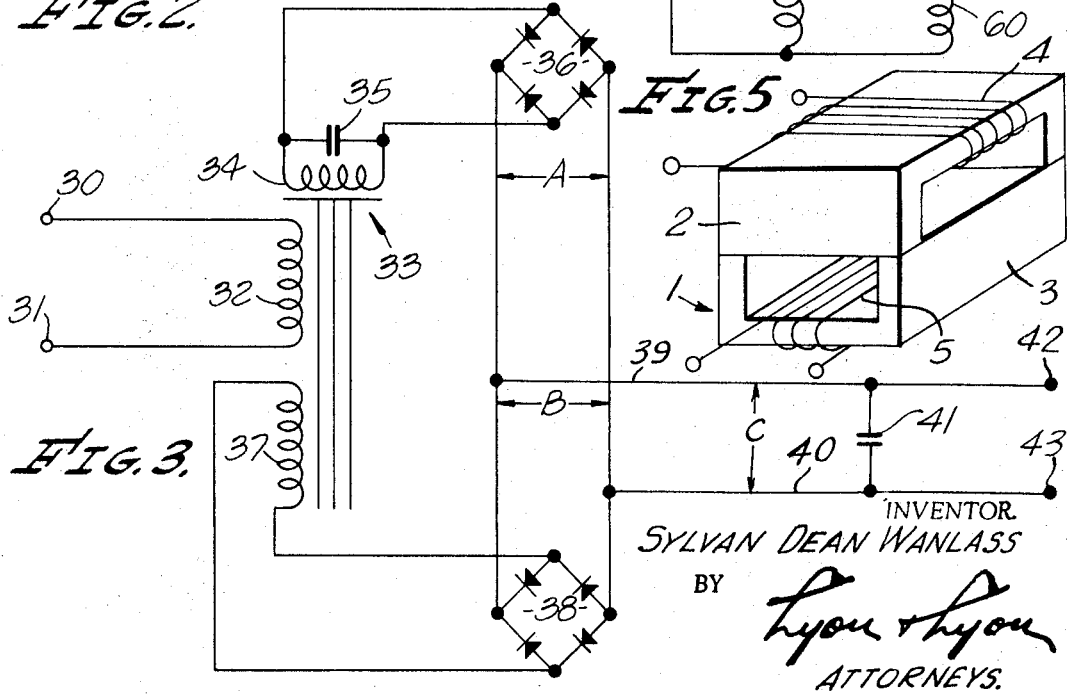
FIG. 3.
FIG. 5.
INVENTOR.
SYLVAN DEAN WANLASS
BY
Lyon & Lyon
ATTORNEYS.

United States Patent Office 3,559,032
Patented Jan. 26, 1971

3,559,032
VOLTAGE REGULATING AND PHASE SHIFTING CIRCUITS EMPLOYING BOTH A PARAMETRIC CIRCUIT AND A TRANSFORMER TO TRANSFER ENERGY
Sylvan Dean Wanlass, Santa Ana, Calif., assignor to Wanlass Electric Company, a corporation of California
Filed Apr. 2, 1968, Ser. No. 718,105
Int. Cl. H02m 1/14, 7/02
U.S. Cl. 321—5
19 Claims

ABSTRACT OF THE DISCLOSURE

Electrical systems each employing a parametric circuit to provide a voltage 90° out of phase with an input voltage and a transformer to provide a voltage in phase with the input voltage and means to mix these two voltages to achieve a third voltage having desired attributes. The two output voltages may be rectified and mixed to produce a rectified output in which unregulated half cycle voltage envelopes are interspersed between the regulated half cycle voltage envelopes produced by the parametric circuit, thus producing in effect a double frequency rectified waveform.

BACKGROUND OF THE INVENTION

In U.S. patent application Ser. No. 589,780 filed Oct. 25, 1966 by Leslie Kent Wanlass and entitled "Parametric Device", now abandoned in favor of application Ser. No. 821,933, filed May 5, 1969 there is disclosed a voltage regulator employing a parametric circuit for providing a regulated output voltage from an unregulated A.C. input voltage. The parametric circuit in that application comprises an L-C circuit, the inductance component of which is a variable inductor device of the type disclosed in U.S. patent application Serial No. 455,939 filed May 14, 1965 by Leslie Kent Wanlass, now Pat. No. 3,403,323. The theoretical considerations and operating principles of this variable inductor and of the parametric circuit are described in detail in these applications, the disclosures of which are incorporated by reference herein. Briefly, the variable inductor disclosed in Pat. No. 3,403,323 comprises a ferromagnetic core having a pair of windings thereon. The core is constructed so that it has four common regions or "legs" and two end or joining portions for magnetically coupling the common regions. The coils are wound on the end portions with their axes displaced at 90° so that normally there is no inductive coupling between them, and so that the flux components generated as a result of passing currents through the two windings are at all times in opposing relationship in two of the legs and an additive relationship in the other two legs. As a result of this construction, the current in one of the windings, referred to as the control winding, generates a magnetic flux which controls the reluctance of the magnetic circuit encompassed by the second winding, referred to as the load winding, in such a manner that variations in this flux caused by variations in the current in the control winding cause the hysteresis loop of the magnetic circuit encompassed by the load winding to be effectively rotated thereby varying the inductance of the load winding. Because of the construction of the device, the inductance varies at twice the frequency of an alternating current applied to the control winding.

This phenomenon is utilized in the parametric circuit disclosed in application Ser. No. 589,780. In that application a capacitor is coupled to the load winding of the variable inductance to form a resonant circuit. Energy is transferred to the resonant circuit by pumping the control winding with an alternating current of the same frequency as that to which the resonant circuit is tuned, that is, the output frequency. Once the parametric circuit builds up to its stable oscillating point, variations in magnitude in the pumping source do not appreciably affect its output. Therefore, by coupling the line to be regulated to the control winding of the inductance device, a regulated, almost perfect sine wave, displaced 90° in phase with the input, can be taken from the resonant circuit. Since there is no direct transformer coupling between the windings, the device serves as a bi-lateral filter, removing transients and noise generated in either the line or the load.

As disclosed in Ser. No. 589,780, a D.C. voltage regulator can be provided by rectifying and filtering the output of the parametric circuit. As in any case where an A.C. voltage is to be rectified and filtered, a relatively large and expensive filtering capacitance is required. Moreover, it has been found that the parametric regulator is somewhat affected by large increases in load, that is, it is not a "stiff" source. While this lack of stiffness is not a disadvantage in many applications, there are applications where it is not desirable.

SUMMARY OF THE INVENTION

According to the present invention, the parametric circuit of the aforementioned application is utilized as a device for producing a pair of 90° phase displaced voltages which can be mixed in various fashions to achieve various output voltage characteristics. The invention, for example, may be used in a D.C. regulator which permits the use of a smaller filtering capacitance and acts as a stiffer source. This is accomplished by using a conventional transformer to develop an output voltage that is in phase with the input voltage. Since the parametric regulator develops an output voltage that is 90° out of phase with the input voltage, these two voltages can be rectified and mixed to form a voltage waveform having a frequency twice that of the input voltage. As a result of this doubling in frequency, the size of the necessary filtering capacitance is reduced, or the same capacitance can be used to achieve lower ripple. Moreover, since one of the output voltages is derived directly from the input voltage, an increase in load has less effect on the output voltage. By selecting the maximum amplitude of the directly coupled voltage to be equal to the desired output, the regulating characteristics of the parametric regulator are not diminished. Of course, the circuit will no longer function as a bi-lateral noise filter because of the direct transformer coupling between the input and the output; however, this is not required in many applications.

The invention may also be used to provide a phase shifting circuit. For this purpose, the in phase and 90° out of phase voltages are passed through amplitude varying devices and then mixed or superimposed. Since a sine wave added to a cosine wave gives a sine wave whose phase depends on the relative amplitudes of the component voltages, it can be seen that an output voltage of variable phase may be obtained. Such a device would be desirable for use with power servos or the like.

It is therefore an object of the present invention to provide an electrical circuit for producing a pair of voltages displaced in phase by 90° and mixing these voltages to produce a third voltage.

It is also an object of the present invention to provide an improved voltage regulator.

It is another object of the present invention to provide a D.C. voltage regulator requiring a smaller filtering capacitance than is normally required.

It is a further object of the present invention to provide a novel phase shifting circuit.

These and other objects of the present invention will become more apparent upon reference to the accompanying description and drawings in which:

BRIEF DESCRIPTION OF THE DRAWINGS

FIG. 1 is a schematic diagram of a first embodiment of a voltage regulator according to the present invention;

FIG. 2 shows the voltage waveforms at different points in the circuit of FIG. 1;

FIG. 3 is a schematic diagram of a second embodiment of a voltage regulator according to the present invention;

FIG. 4 is a schematic diagram of a phase shifting circuit according to the present invention; and FIG. 5 is a perspective view of a variable inductor useful in the circuits of the present invention.

DESCRIPTION OF THE INVENTION

In the drawings, the convention adopted in the aforementioned applications for indicating a core according to the teachings of Pat. No. 3,403,323 is followed, that is, such a core is indicated by the use of a T-shaped iron symbol. While any of the various core structures illustrated and described in that application could be used in this invention, the preferred construction is similar to that shown in FIG. 7 of that application. An inductor utilizing such a core is shown in FIG. 5. Inductor 1 comprises a magnetic core made up of two C-cores 2 and 3 rotated 90° from each other and joined at their bases so as to form four legs or common regions. The core 2 has a winding 4 wound thereon while the core 3 has a winding 5 wound thereon, the windings 4 and 5 being preferably at right angles.

Turning now to FIG. 1, an unregulated A.C. input voltage is applied to terminals 10 and 11. The control winding 12 of a variable inductor 13 of the type described is connected across the input terminals 10 and 11. The load winding 14 of the inductor 13 has a capacitor 15 coupled thereacross to form a resonant circuit. The resonant circuit 14, 15 is preferably tuned to the frequency of the input voltage. A full wave rectifier 16 is connected across the resonant circuit 14, 15 and produces a rectified voltage A as shown in FIG. 2.

The primary winding 17 of a conventional transformer T is also coupled across the input terminals 10 and 11. The secondary winding 18 of the transformer T is connected to a full wave rectifier 19 with the result that the waveform shown in B in FIG. 2 is produced. While a transformer connection is shown, it will be obvious that a direct connection between the input terminals 10 and 11 and the rectifier 19 could be employed if electrical isolation was not necessary. The positive sides of both of the rectifiers 16 and 19 are conected to a line 20 while the negative sides are connected to a line 21. Since the voltage A is 90° out of phase with the input voltage and the voltage B is in phase with the input voltage, the voltage waveform shown at C in FIG. 2 is developed across the lines 20 and 21. As can be seen in FIG. 2, this voltage is effectively at four times the frequency of the input voltage. A capacitor 22 is connected across the lines 20, 21 to provide a filtered, regulated direct current voltage at the output terminals 23 and 24. Since the voltage C has a frequency four times that of the input frequency, the size of the capacitor 22 can be approximately one half of what would normally be required without the insertion of the voltage B into the voltage A. By proper selection of the turns ratio of the transformer T, the maximum amplitude of the voltage B can be selected so that it does not unduly decrease the regulation provided by the parametric circuit. In other words, if the input voltage appearing at terminals 10 and 11 is subject to variations of plus or minus 10%, the turns ratio of the transformer T is selected so that the magnitude of the output voltage B will be equal to or slightly less than the magnitude of the output voltage A when the input voltage at terminals 10 and 11 is at a maximum, that is, 10% higher than rated.

FIG. 3 shows another embodiment of the present invention which operates in the same manner as the embodiment shown in FIG. 1. In FIG. 3, an unregulated A.C. voltage is applied to input terminals 30 and 31 to which is connected the control winding 32 of a variable inductor 33 of the type described. The load winding 34 of the variable inductor 33 has a capacitor 35 coupled across it to form a resonant circuit, the output of which is applied to a full wave rectifier 36.

Rather than provide a separate transformer as is done in the embodiment of FIG. 1, an additional winding 37 is wound on the core of the variable inductor 33 adjacent to the winding 32 so that it is transformer coupled thereto. The output of the winding 37 is rectified by the full wave rectifier 38. The output of the rectifiers 36 and 38 are connected to lines 39 and 40 across which is connected a capacitor 41 and to which are connected the output terminals 42 and 43. As was the case with the circuit of FIG. 1, the output voltage of the rectifier 36 will have a waveform such as that shown as A in FIG. 2 while the output of the rectifier 38 will have a waveform such as that shown at B in FIG. 2. The waveform of the voltage appearing across the lines 39 and 40 will again be that shown at C in FIG. 2. Once again, the fitering capacitor 41 need only be about half the size that would normally be required if the frequency doubling was not accomplished.

By use of the additional winding 37 on the core of the inductor device 33, the power handling capacity of the regulator is approximately doubled and, of course, the necessary filtering capacity halved. It can thus be seen that a very economical and satisfactory voltage regulator can be provided in accordance with the teachings of the present invention if no bi-lateral noise rejection is required. As has been pointed out, this is the case in many applications.

In FIG. 4 there is shown a phase shifting circuit constructed according to the present invention. An A.C. input voltage is applied to terminals 50 and 51. The control winding 52 of a variable inductor 53 of the type described is connected across input terminals 50 and 51. The load winding 54 of the inductor 53 has a capacitor 55 coupled thereacross to form a resonant circuit. The resonant circuit 54, 55 is preferably tuned to the frequency of the input voltage. A variable autotransformer 56 is connected across the resonant circuit 54, 55 and produces an output voltage of variable amplitude displaced 90° out of phase with the input voltage across a first primary winding 57 of a transformer 58.

A second variable autotransformer 59 is connected across terminals 50 and 51 and produces an output voltage of variable amplitude which is in phase with the input voltage across a second primary winding 60 of the transformer 58. The transformer 58 acts as a mixer and produces a voltage across its secondary winding 61 having a phase dependent on the relative amplitudes of the voltages produced by autotransformers 56 and 59.

It will be obvious to those skilled in the art that the provision of two voltages 90° out of phase will have many other specific forms without departing from the spirit or central characteristics thereof. The present embodiments are therefore to be considered in all respects as illustrative and not restrictive.

What is claimed is:

1. An electrical system comprising:
an input circuit adapted to be connected to a source of A.C. voltage;
a parametric device having a resonant circuit oscillating at a stable point, an output circuit coupled to said resonant circuit for delivering a first voltage constantly displaced approximately 90° out of phase with said A.C. voltage, and first means coupling said input circuit to said resonant circuit for transferring energy from said input circuit to said resonant circuit to maintain said oscillations at said stable point;

second means coupled to said input circuit to deliver a second voltage constantly in phase with said A.C. voltage whereby first and second voltages remain approximately 90° out of phase; and third means coupled to said output circuit and said second means for mixing said first and second voltages.

2. The system of claim 1 wherein said third means includes means for rectifying said first and second voltages.

3. The system of claim 1 wherein said third means includes means for varying the relative amplitudes of said first and second voltages.

4. The system of claim 1 wherein said second means includes transformer means.

5. An electrical system comprising:
an input circuit adapted to be connected to a source of A.C. voltage;
a variable inductor comprising a magnetic core having four common regions and two end regions magnetically joining said common regions, a load winding wound on said core and encompassing a magnetic circuit therein, the effective reluctance of said magnetic circuit controlling the inductance of said load winding, and a control winding wound on said core, said control winding being responsive to current therein for controlling the effective reluctance of said magnetic circuit whereby variations in said current vary the inductance of said load winding;
a capacitor connected to said load winding to form a resonant circuit therewith; first means coupling said input circuit to said control winding whereby said resonant circuit delivers a first voltage constantly displaced approximately 90° out of phase with said unregulated A.C. voltage;
second means coupled to said input circuit to deliver a second constantly voltage in phase with said A.C. voltage whereby said first and second voltages remain approximately 90° out of phase; and
third means coupled to said resonant circuit and said input circuit for mixing said first and second voltages to produce a third voltage.

6. A voltage regulator comprising:
an input circuit adapted to be connected to a source of unregulated A.C. voltage;
a parametric device having a resonant circuit oscillating at a stable point, an output circuit coupled to said resonant circuit for delivering a first, regulated voltage constantly displaced approximately 90° out of phase with said unregulated A.C. voltage, and first means coupling said input circuit to said resonant circuit for transferring energy from said input circuit to said resonant circuit to maintain said oscillations at said stable point;
means coupled to said input circuit to deliver a second voltage constantly in phase with said unregulated A.C. voltage whereby said first and second voltages remain approximately 90° out of phase;
first rectifier means for rectifying said first voltage;
second rectifier means for rectifying said second voltage; and
means for mixing the outputs of said first and second rectifying means.

7. A voltage regulator comprising:
an input circuit adapted to be connected to a source of unregulated A.C. voltage;
a variable inductor comprising a magnetic core having four common regions and two end regions magnetically joining said common regions, a load winding wound on said core and encompassing a magnetic circuit therein, the effective reluctance of said magnetic circuit controlling the inductance of said load winding, and a control winding wound on said core, said control winding being responsive to current therein for controlling the effective reluctance of said magnetic circuit whereby variations in said current vary the inductance of said load winding;
a capacitor connected to said load winding to form a resonant circuit therewith; first means coupling said input circuit to said control winding whereby said resonant circuit delivers a first, regulated voltage constantly displaced approximately 90° out of phase with said unregulated A.C. voltage;
second means coupled to said input circuit to deliver a second voltage having a magnitude less than said first voltage and constantly in phase with said unregulated A.C. voltage whereby said first and second voltages remain approximately 90° out of phase;
first rectifier means coupled to said resonant circuit for rectifying said first voltage;
second rectifier means coupled to said second means for rectifying said second voltage; and
means coupled to said first and second rectifier means for mixing the outputs thereof.

8. The regulator of claim 7 wherein said second means includes transformer means.

9. The regulator of claim 8 wherein said transformer means comprises a transformer having primary and secondary windings, said primary winding being coupled to said input circuit and said secondary winding being coupled to said second rectifier means.

10. The regulator of claim 8 wherein said transformer means comprises a secondary winding wound on said magnetic core parallel to said control winding and inductively coupled thereto.

11. The regulator of claim 8 wherein capacitor means are coupled to said mixing means.

12. The regulator of claim 8 wherein said resonant circuit is tuned to the frequency of said unregulated A.C. voltage.

13. The regulator of claim 8 wherein said control winding is wound on said core substantially transverse to said load winding.

14. A phase shifting circuit comprising:
an input circuit adapted to be connected to a source of A.C. voltage;
a variable inductor comprising a magnetic core having four common regions and two end regions magnetically joining said common regions, a load winding wound on said core and encompassing a magnetic circuit therein, the effective reluctance of said magnetic circuit controlling the inductance of said load winding, and a control winding wound on said core, said control winding being responsive to current therein for controlling the effective reluctance of said magnetic circuit whereby variations in said current vary the inductance of said load winding;
a capacitor connected to said load winding to form a resonant circuit therewith; first means coupling said input circuit to said control winding whereby said resonant circuit delivers a first voltage displaced approximately 90° out of phase with said A.C. voltage;
second means coupled to said input circuit to deliver a second voltage in phase with said unregulated A.C. voltage;
third means coupled to said resonant circuit for varying the amplitude of said first voltage;
fourth means coupled to said second means for varying the amplitude of said second voltage; and
means coupled to said third and fourth means for mixing the outputs thereof and producing a third voltage displaced in phase from said first and second voltages.

15. The phase shifting circuit of claim 14 wherein said second means includes transformer means.

16. The regulator of claim 15 wherein said transformer means comprises a secondary winding wound on said magnetic core parallel to said control winding and inductively coupled thereto.

17. The regulator of claim 15 wherein said third and fourth means comprises variable autotransformers.

18. The regulator of claim 15 wherein said mixing means comprises transformer means.

19. The regulator of claim 15 wherein said control winding is wound on said core substantially transverse to said load winding.

References Cited

UNITED STATES PATENTS

| 1,708,908 | 4/1929 | Spencer | 321—5 |
| 2,209,948 | 8/1940 | Harmer | 321—5 |
| 2,473,662 | 6/1949 | Pohm | 321—5 |
| 3,403,323 | 9/1968 | Wanlass | 323—56 |
| 3,409,822 | 11/1968 | Wanless | 321—16X |

WILLIAM H. BEHA, JR., Primary Examiner

U.S. Cl. X.R.

321—10, 25